June 28, 1927.  C. G. SINCLAIR  1,633,796
WASHING MACHINE
Filed March 31, 1925    3 Sheets-Sheet 2

INVENTOR.
Cyril G. Sinclair
BY
Parker & Burton
ATTORNEY.

June 28, 1927.
C. G. SINCLAIR
WASHING MACHINE
Filed March 31, 1925
1,633,796
3 Sheets-Sheet 3
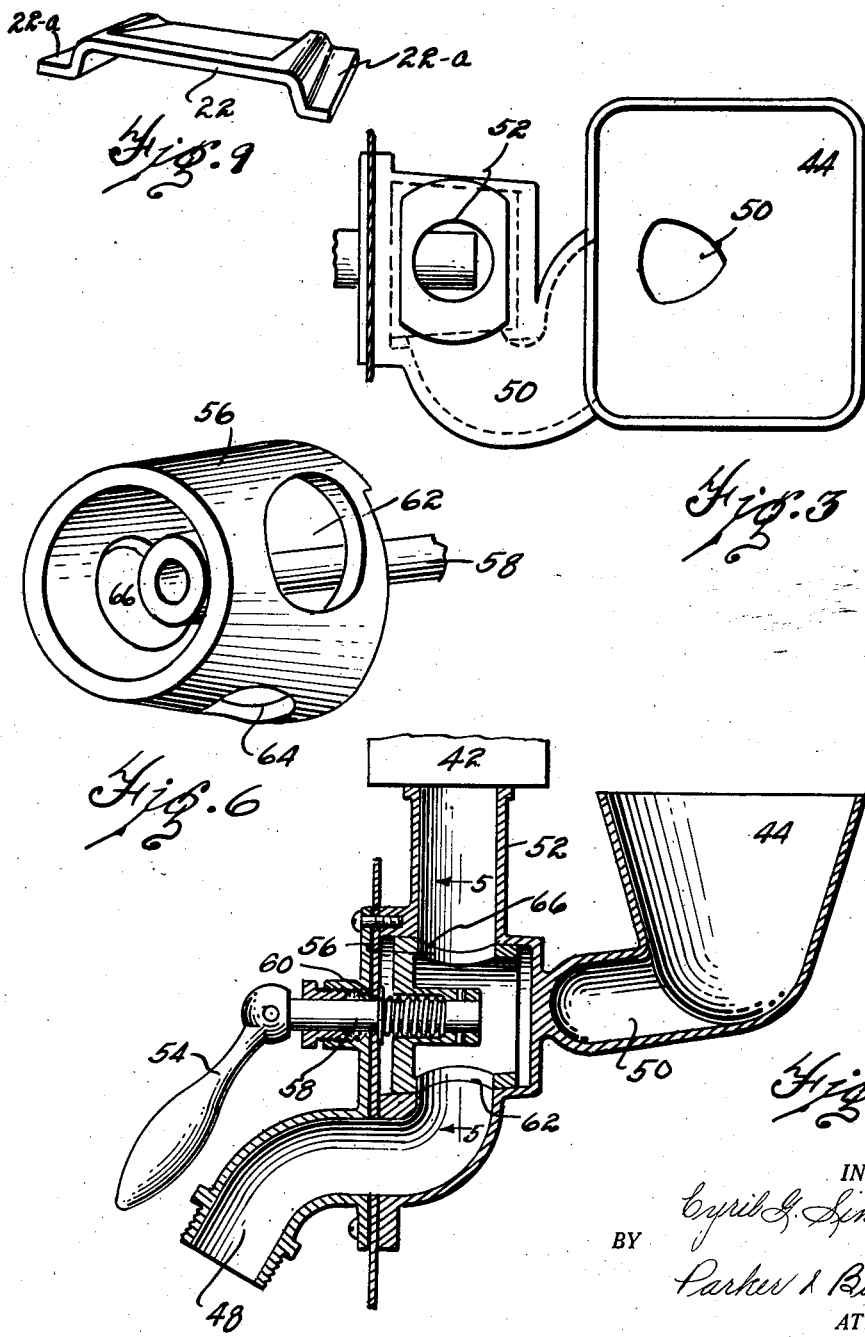

Patented June 28, 1927.

1,633,796

UNITED STATES PATENT OFFICE.

CYRIL G. SINCLAIR, OF TORONTO, ONTARIO, CANADA, ASSIGNOR, BY MESNE ASSIGNMENTS, TO RELIANCE STORAGE AND WAREHOUSE COMPANY, OF DETROIT, MICHIGAN, A CORPORATION OF MICHIGAN.

WASHING MACHINE.

Application filed March 31, 1925. Serial No. 19,710.

My application relates to improvements in washing machines and particularly to machines of the character illustrated in my copending application, Serial No. 715,103, filed May 22, 1924.

In this machine I provide a clothes basket, rotatably supported within a washing machine vat and adapted to contain the clothes during the washing operation and the drying operation. The vat is provided with a drainage receptacle disposed about the basket to catch the centrifugal discharge thereof and the wall of the basket is provided near its upper edge with a plurality of discharge apertures.

In my improved machine herein set forth and claimed, an advantageous feature is the provision of a shroud for each wall aperture which extends from the wall of the basket to an overhanging rim flange and is open at each end to prevent the pocketing of the water therein with resulting vibration of the basket and an individual hood extending over each aperture on the outside of the basket to direct the water thrown through the aperture downwardly into the drainage receptacle which surrounds the basket.

The apertures in the side wall of the basket through which the contents discharge, due to centrifugal force, are disposed at the extreme top of the side wall immediately adjacent the overhanging rim flange which prevents any unbalancing of the basket due to the collection of an annular pocket of water at the extreme top of the basket wall immediately adjacent the overhanging rim flange as might result in case the discharge apertures were not so positioned.

I provide a second drainage receptacle underneath the basket to catch the drainage exhausted through a controlled discharge opening in the bottom of the basket and an object of importance is the employment of valve mechanism having a suitable outlet and communicating with each drainage receptacle, which valve mechanism is operable to place either or both drainage receptacles into communication with the outlet to discharge therethrough, and also operable to place the two drainage receptacles in communication with each other so that the receptacle that extends around the basket may be discharged through the receptacle underneath the basket into the vat of the machine within which the basket is mounted.

The drainage receptacle, which is adapted to catch the centrifugal discharge of the basket, extends up around the basket to such a height as to form a chamber of sufficient capacity to hold all the centrifugal discharge of the basket at its maximum rate of discharge which cannot escape through the valve outlet provided therefor during the period of its operation. This annular drainage collector is cut away to accommodate brake operating mechanism and the shroud for such operating mechanism extends through the drainage chamber.

The above objects and advantages, together with others of importance will more fully appear from the following specification, accompanying drawings and appended claims.

In the drawings:

Fig. 3 is a plan of the valve casting.

Fig. 4 is a vertical sectional view through the valve casting.

Fig. 6 is a perspective of a portion of the valve mechanism.

Fig. 7 is an enlarged fragmentary sectional view through the upper portion of the basket wall on the line 7—7 of Fig. 8.

Fig. 8 is an enlarged fragmentary elevation of the upper portion of the basket wall shown in Fig. 1 and being partly broken away.

Fig. 9 is a perspective of the cast hood 22.

Figure 1:
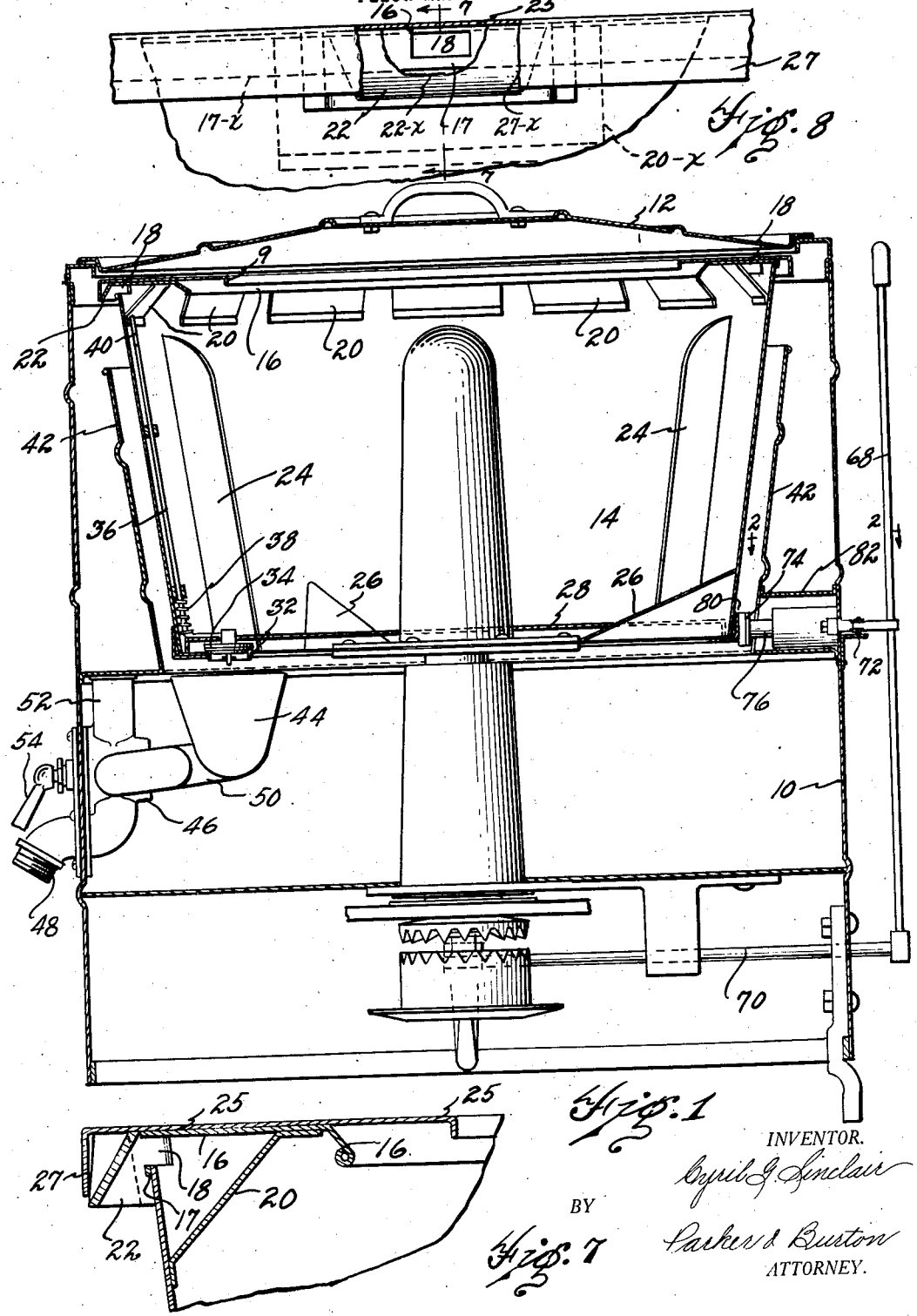
Fig. 1 is a vertical sectional view of my improved machine.
Figure 2:
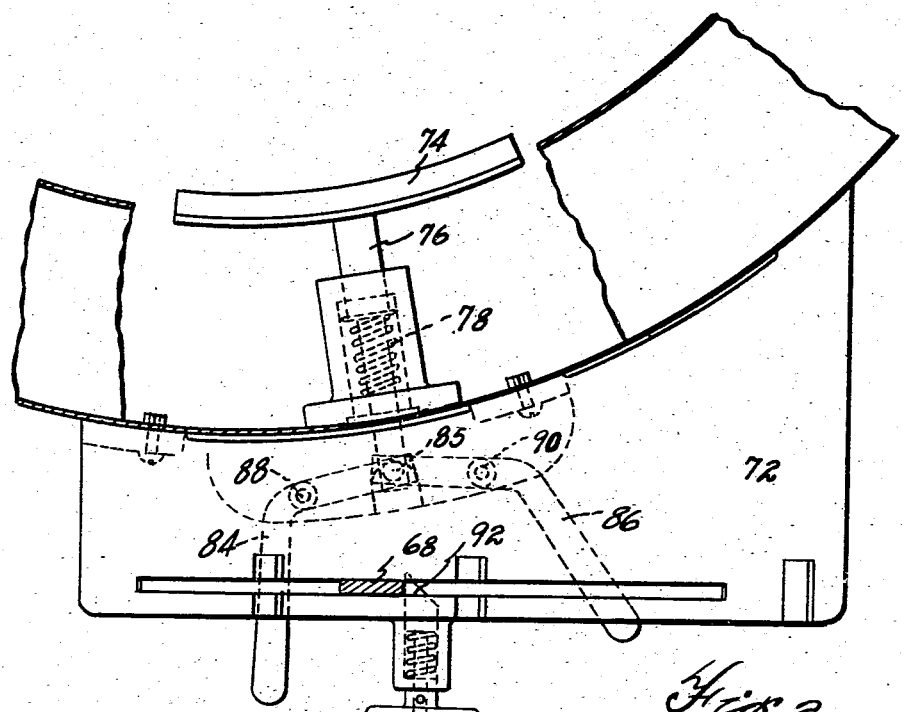
Fig. 2 is a fragmentary horizontal sectional view showing the brake operating mechanism taken on line 2—2 of Fig. 1.

I provide a suitably supported vat 10, having a removable cover 12, and containing a clothes basket 14, rotatably supported within the upper portion of the vat and adapted to be driven by power mechanism not shown in the drawings in such a manner as to accomplish the washing operation and also the drying operation without removing the clothes from the basket. The basket has an interiorly extending overhanging rim flange 16 turned down over the exterior thereof as at 17 and secured thereto. A plurality of elongate discharge apertures 18 are formed through the extreme upper portion of its side wall in immediate proximity to such flange. A shroud 20 extends from the flange to the wall of the basket over each aperture, which shroud is open at both ends so as to prevent any pocketing of the water therein during the rapid rotation of the basket.

On the outer wall of the basket a hood 22 extends over each aperture to direct the discharge therethrough downwardly. This hood 22, as shown in perspective in Fig. 9, slopes downwardly away from the basket wall as shown in Fig. 7 and has ends provided with flanges 22ª by means of which it is secured to the wall of the basket and intermediate its ends it is depressed to form a sloping interior surface opposite the aperture 18. The outer flange 17 of the rim member 16 is cut away to correspond with openings 18 through the basket wall.

There is provided a rigid overhanging rim plate 25 which extends interiorly of the basket beyond the rim flange 16, as shown in Fig. 7, and by means of which the basket may be lifted from the vat. This plate is turned downwardly exteriorly of the basket at 27, as shown in Figs. 1 and 7. In Fig. 8 which is an enlarged fragmentary elevation this downwardly turned portion 27 is broken away at 27ˣ to show the cast hood 22 which in turn is broken away at 22ˣ to show the aperture 18 and the flange 17 of the rim member 16, which flange is also shown in dotted outline at 17ˣ and the hood 20 appears in dotted outline at 20ˣ.

These individually shrouded apertures 18 are positioned at the extreme upper portion of the side wall of the basket in immediate proximity to overhanging rim flange 16 as it was found that in the construction in which the apertures were not so placed there was a tendency for the basket to wobble due to unbalanced weight produced in part by the collection of an annular pocket of water immediately underneath the rim flange 16 and above the apertures 18.

The basket has a plurality of radially extending vertical wall ribs 24 and a limited number of radially extending floor ribs 26 which slope from the wall toward the center of the basket and form pockets within which the clothes settle after the water is drained off and wherein they are retained against unequal displacement during the rapid continuous rotation of the basket in such a manner as to balance the weight thereof. The basket has a perforated false bottom 28 spaced above the true bottom of the basket to support the clothes free of the discharge opening 32 which is controlled by a closure 34, operable by a control rod 36 that extends upwardly along the wall of the basket between a pair of adjacent wall ribs 24 and is held downwardly by a spring 38 to close the opening 32, and provided with a hand-grip portion 40 whereby it may be elevated to permit the contained water in the basket to be exhausted. The closure 34 is disposed in the space underneath the false bottom 28 and may therefore be elevated to open the discharge aperture 32 without any interference by the clothes, and the water drains out rapidly due to the clothes being supported upon the false bottom so as not to clog the discharge aperture.

Secured to the wall of the vat is an auxiliary drainage receptacle 42 that extends around the basket and is adapted to collect the discharge therefrom through the openings 18. There is also provided a second drainage receptacle 44 in the form of a bowl positioned underneath the basket to catch the discharge through the floor opening 32.

I provide valve mechanism indicated in assembly as 46, which has an outlet 48 to drain into any suitable container, and an inlet 50 that communicates with the bowl 44, and an inlet 52 that communicates with the auxiliary wall receptacle 42, which valve mechanism is operable by means of a handle 54 to place its outlet 48 into communication with either receptacle 42 or 44, or with both receptacles at the same time to exhaust the water contained therein. The rotary valve member 56 is also operable to place the receptacle 42 into communication with the receptacle 44 through the valve so that the contents of the receptacle 42 may be discharged through the receptacle 44 into the vat 10 of the machine.

Figure 5:
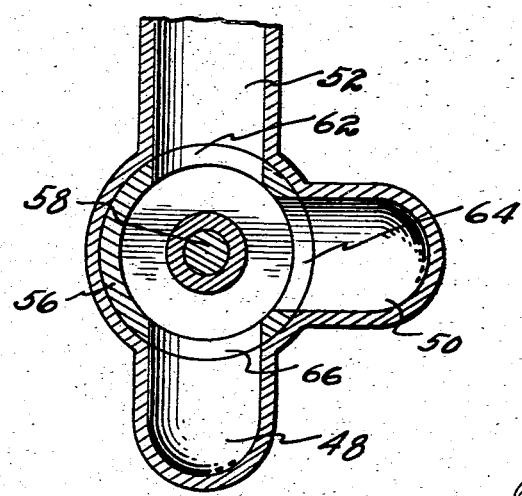
Fig. 5 is a vertical sectional view taken on line 5—5 of Fig. 4.

This valve member 56 is carried by a pin 58 and held yieldably by a spring 60 against the tapered seat in the valve casing to form a close joint therewith. The valve member is hollow and is provided with a plurality of openings 62, 64, and 66, through its side wall. In Fig. 4 this valve member is shown as so disposed as to provide a clear passageway through openings 66 and 62 for the discharge of the contents of receptacle 42. The outlet from receptacle 44 is closed. If the valve member is rotated in a counter clockwise direction through an arc of 90°, receptacle 44 is open to discharge through openings 62 and 64 and the outlet from receptacle 42 is closed. Further rotation of the valve member through an arc of 90° opens both receptacles 42 and 44 to discharge as appears in Fig. 5. Receptacle 44 discharges through openings 64 and 66, and receptacle 42 through openings 62 and 66. A further rotation of the valve member through another arc of 90° will open receptacle 42 through opening 64 to discharge through opening 66 into receptacle 44 and overflow into the vat as receptacle 42 is at a higher level than receptacle 44.

It is desirable in my washing machine that a method be provided whereby certain of the water may be retained for reuse after having once been used and certain of the water may be entirely dispensed with, and the construction above described is one adapted to facilitate this end. It has been found advantageous to preserve the suds water after it has once been used for reuse and this may be done by placing the valve mechanism in position so that receptacle 42 may drain through the bowl 44 into the vat and this water be preserved while, without removing the clothes from the basket, they may be run through a rinse water and the valve mechanism placed in position to discharge this rinse water clear of the vat through the valve exhaust 48.

The drainage collector 42 extends up about the basket to such a height as to form a receptacle of such a size as to accommodate all the water normally discharged centrifugally by the basket, which cannot in the period of operation of the basket be discharged from the collector through the valve mechanism.

As described in my copending application, Serial No. 715,102, filed May 22, 1924, I provide brake mechanism, responsive automatically to the control exercised over the rotation of the basket, whereby whenever the control mechanism is actuated to release the basket from its driving couple, the brake mechanism responds automatically engaging the basket to retard its rotation.

There is a hand lever 68 mounted upon a shaft 70, which shaft is connected with the control mechanism to couple the basket with the driving mechanism for either rapid continuous rotation or slow rotary oscillation. This lever is shiftable through a slotted guide plate 72. A brake shoe 74, having a connecting link 76, is held by a spring 78 against a brake band 80, which encircles the bottom of the basket. This brake shoe operating member extends through the receptacle 42 and a shroud 82 is provided therefor. The link 76 that holds the shoe is adapted to be retracted by either one of two crank levers, 84 or 86, which levers are pivoted to said link at 85 and to the plate 72 at 88 and 90 respectively. These levers are so disposed as to be engaged by the hand lever 68 when it is swung to operate the coupling mechanism. There is provided a spring controlled latch 92 adapted to permit the lever to be swung freely in one direction from one driving position to the other but adapted to prevent the lever from being swung freely in the reverse direction without manipulation of the latch to permit such movement.

The operating mechanism may, therefore, be actuated freely from the driving relationship of slow rotary oscillation to that of continuous rotation, but when the lever is swung to couple the basket with the driving mechanism from the relationship of rapid continuous rotation to that of slow rotary oscillation, its movement is impeded by the latch member and the rotation of the basket is retarded by the brake shoe and the latch member must be released by hand before the lever is capable of being swung to complete the movement.

What I claim is:

1. In a washing machine, a vat, a clothes basket rotatably supported therein and provided with drain apertures near its upper edge and a controlled drain opening in its bottom; a wall receptacle carried by the vat extending upwardly about the basket to catch the discharge through the drain apertures in the upper portion of the basket wall; a bowl disposed to catch the discharge through the opening in the bottom of the basket; valve mechanism having a discharge outlet and an inlet communicating with said wall receptacle to drain the same and a second inlet communicating with the bowl disposed to catch the discharge through the drain opening in the bottom of the basket, which valve mechanism is provided with means operable to open said inlets independently or jointly to discharge through the outlet and operable to close said outlet and connect the inlet to the wall receptacle with the bowl to discharge the contents of the wall receptacle through the bowl into the vat.

2. In a washing machine, a vat, a clothes basket rotatably supported therein and provided with wall apertures for centrifugal discharge and a controlled floor aperture through which the contents may be drained, an annular receptacle arranged to catch the discharge through such wall apertures; a second receptacle positioned underneath the basket to catch the discharge through said floor aperture and valve mechanism having a discharge outlet communicating with each of said receptacles, and means operable to place either receptacle into communication with the discharge outlet to exhaust therethrough or to place said receptacles into communication with each other.

3. In a washing machine, a vat, a basket rotatably supported therein and provided with a plurality of wall apertures, each of said wall apertures provided with a shroud which extends circumferentially the basket and is open at each end, said basket also provided with a controlled drainage outlet through the floor thereof; a drainage receptacle disposed about the basket to catch the discharge through the wall apertures of the basket; a second drainage receptacle disposed underneath the basket to catch the discharge through said floor aperture and valve mechanism having a discharge outlet and communicating with each of said receptacles, operable to place either receptacle in communication with the discharge outlet to exhaust therethrough or to place said receptacles into communication with each other to exhaust the first one through the second one into the vat.

4. In a washing machine, a vat, a clothes basket rotatably supported therein, said basket provided with an overhanging rim flange and a plurality of discharge apertures through its wall in proximity to said flange, and a shroud extending from the flange to the wall over each aperture and being open at both ends.

5. In a washing machine, a vat, a clothes basket rotatably supported therein, said basket provided with an interiorly extending overhanging rim flange and a discharge aperture through the extreme upper portion of its side wall in immediate proximity to said flange; a hood open at one end extending from said flange to the side wall over said aperture on the interior of the basket and a hood open at the bottom extending from said side wall over the aperture on the exterior of the basket.

6. In a washing machine, a vat, a clothes basket rotatably supported therein, an auxiliary annular receptacle within said vat about said basket, said basket provided with an overhanging rim flange and a plurality of discharge apertures through its wall in immediate proximity to the flange and a shroud open at each end extending from the flange to the wall over each aperture, and a hood over each aperture on the opposite side of the basket wall open at the bottom to direct the discharge therethrough downwardly into said annular receptacle.

7. In a washing machine, a vat, a clothes basket rotatably supported therein, an annular drainage receptacle within the vat surrounding said basket, said basket provided with an overhanging rim flange, a plurality of discharge apertures through its wall in proximity to said flange, a plurality of vertical wall ribs, a discharge opening through the bottom of the basket, a closure for said discharge opening controlled by an operating rod extending upwardly along the basket wall, a second drainage receptacle underneath the basket disposed to catch the discharge through the floor opening of the basket, and valve mechanism having an outlet and an inlet communicating with each of said drainage receptacles, said valve mechanism operable to open each drainage receptacle to discharge through the valve outlet and operable to close the outlet and open the first drainage receptacle to discharge through the second receptacle into the vat.

8. In a washing machine, a vat, a clothes basket rotatably supported therein, said basket provided with a controlled discharge aperture through its floor and a plurality of discharge apertures in the upper portion of its side wall, a bowl disposed underneath the basket to catch the discharge through the floor aperture, an annular drainage collector arranged about said basket extending substantially the full height thereof but terminating below the drainage apertures through the side wall of the basket and above said bowl, a common conduit having an outlet and communicating with said bowl and annular drainage collector, and means for controlling the flow through said conduit operable to place said bowl and annular drainage collector into communication so the drainage collector will discharge through the bowl and operable to open either the annular drainage collector or the bowl to discharge through the conduit.

9. In a washing machine, a vat, a clothes basket rotatably supported therein, said basket provided in proximity its upper edge with a discharge aperture through its side wall and a shroud open at each end extending from the side wall over such discharge aperture.

In testimony whereof, I sign this specification.

CYRIL G. SINCLAIR.